Patented June 4, 1929.

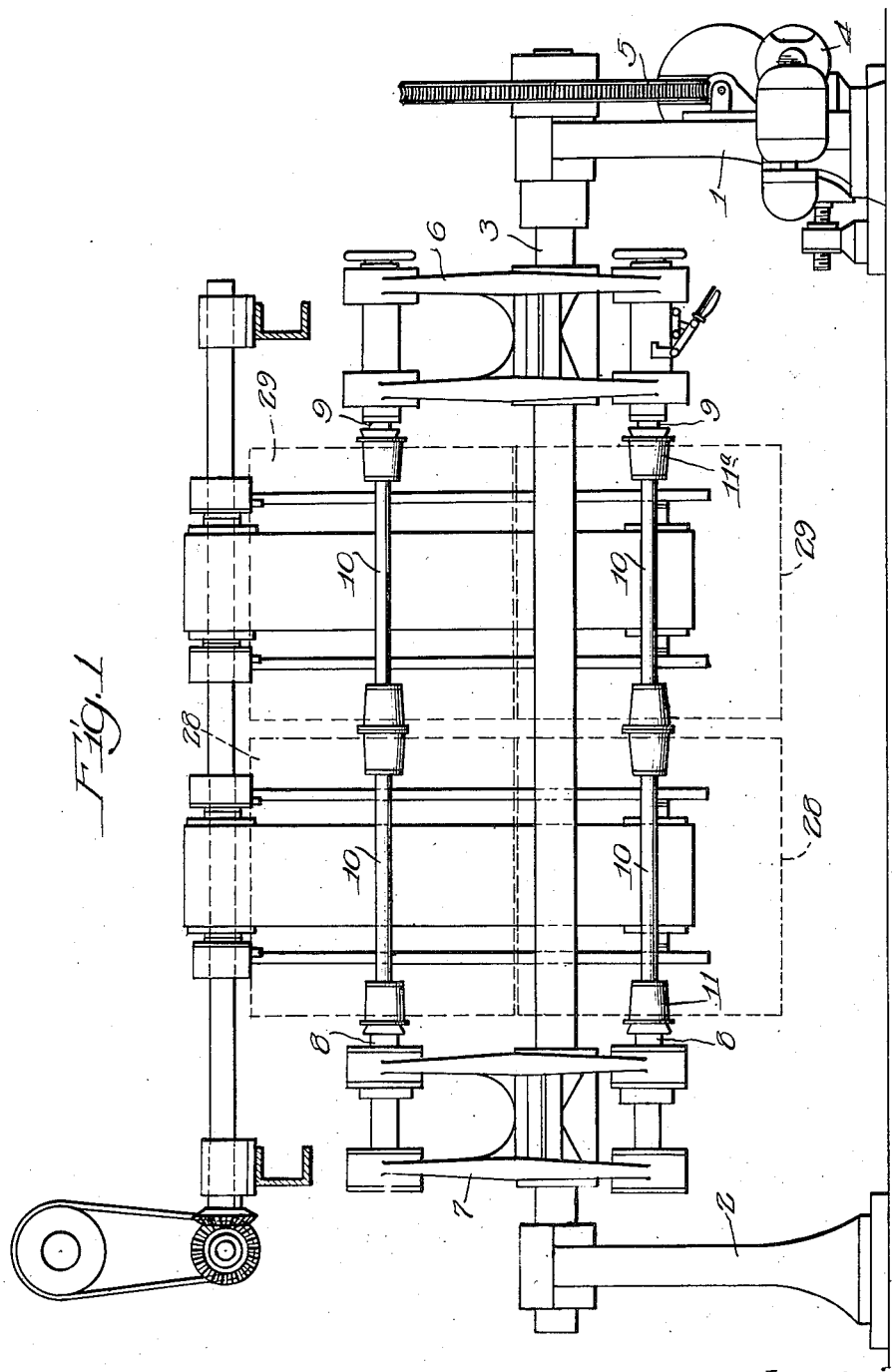

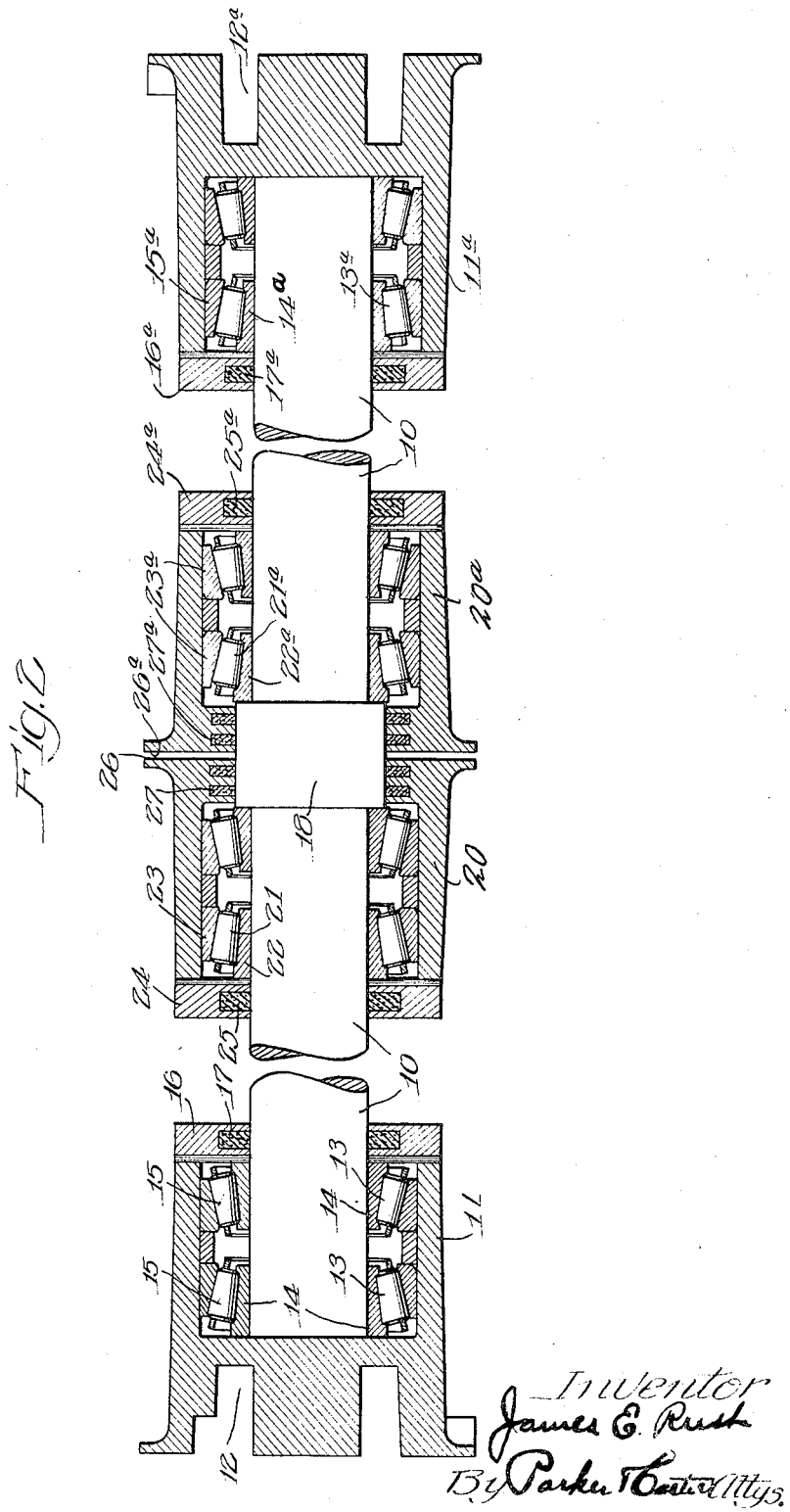

1,716,089

UNITED STATES PATENT OFFICE.

JAMES E. RUST, OF PARK RIDGE, ILLINOIS, ASSIGNOR TO GUSTAVUS A. E. KOEHLER, OF CHICAGO, ILLINOIS.

REEL.

Application filed July 15, 1927. Serial No. 205,885.

This invention relates to reels particularly adapted to be used in delivering paper to newspapers, and has for its object to provide a new and improved device of this description. The invention has as a further object to provide a reel wherein two rolls of paper can be simultaneously used on the same mandrel. The invention has other objects which are more particularly pointed out in the accompanying description.

Referring now to the drawings,—

Figure 1 is a view showing one form of reel embodying the invention;

Figure 2 is a view in part section showing the mandrel and the bearings for the paper rolls.

Like numerals refer to like parts throughout the several figures.

Referring now to the drawings, I have shown a reel comprising the supports 1 and 2, upon which is mounted the shaft 3. This shaft has some suitable means for rotating it. As herein shown, a motor 4 is used for this purpose, the same motor being operatively connected with the gear 5 on the shaft 3. The shaft has connected thereto, so as to rotate therewith, the arms 6 and 7, which are provided with spindles 8 and 9 upon which the roll of paper is mounted when a single roll is inserted between one of the spindles and the opposed spindle 9.

It often happens that it is desirable to run two rolls of paper from the said set of spindles, as, for example, where papers of different colors are simultaneously used with one press or with different presses, or where one reel is used in connection with two presses. In order to secure this result, I provide a mandrel 10. This mandrel has rotatably mounted thereon at each end the spindle bearings 11 and $11^a$, which are similar in construction. These bearings are arranged to receive the opposed spindles 8 and 9 of the reel, said spindles projecting into the recesses 12 and $12^a$. These spindle bearings are preferably roller bearings and are provided with the rollers 13 and $13^a$, which run between bearing rings 14 and $14^a$ on the mandrel and bearing rings 15 and $15^a$ on the spindle bearing. The spindle bearings are provided with the rings 16 and $16^a$ having the packing 17 and $17^a$. There is a center bearing which consists of two spindle bearings for the adjacent ends of the two rolls. The mandrel is provided with an enlargement 18 at the center and these spindle bearings 20 and $20^a$ are located on opposite sides of this enlargement. These central spindle bearings are provided with rollers 21 and $21^a$ which run in bearing rings 22 and $22^a$ on the mandrel and 23 and $23^a$ in the spindle bearings. These spindle bearings are provided with the rings 24 and $24^a$ having a packing 25 and $25^a$. The adjacent ends of the spindle bearings have end walls 26 and $26^a$ opposed to the enlargement 18 of the mandrel and provided with packing 27 and $27^a$.

By means of this construction two rolls of paper 28 and 29 may be operated from the same reel between the opposed spindles 8 and 9, as shown in Fig. 1. The web of these rolls may be run off in the same direction or in opposite directions. When in use the spindle bearings 11 and 20 will rotate as a unit when the roll of paper 28 is being used, and the spindle bearings $20^a$ and $11^a$ will rotate as a unit with the roll 29.

I claim:

1. A reel comprising two separated supports, a shaft mounted thereon, arms connected to said shaft, opposed spindles connected with said arms, a mandrel spanning the space between said spindles and provided with bearings therefor, said mandrel having intermediate rotating bearings for the ends of two rolls of paper.

2. A reel comprising two separated supports, a shaft mounted thereon, arms connected to said shaft, opposed spindles connected with said arms, a mandrel spanning the space between said spindles and provided with bearings therefor, said mandrel being provided with an enlargement near its center, two bearings one on each side of said enlargement and adapted to receive the adjacent ends of two rolls of paper.

3. A reel comprising two separated supports, a shaft mounted thereon, arms connected to said shaft, opposed spindles connected with said arms, a mandrel spanning the space between said spindles and provided with bearings therefor, said mandrel being provided with an enlargement near its center, two bearings one on each side of said enlargement and adapted to receive the adjacent ends of two rolls of paper, the adjacent ends of said bearings being provided with walls opposed to said enlargement.

4. A reel comprising two separated supports, a shaft mounted thereon, arms connected to said shaft, opposed spindles connected with said arms, a mandrel spanning the space between said spindles and provided with bearings therefor, said mandrel being provided with an enlargement near its center, two bearings one on each side of said enlargement and adapted to receive the adjacent ends of two rolls of paper, the adjacent ends of said bearings being provided with walls opposed to said enlargement, said walls being provided with packing which engages said enlargement.

Signed at Chicago, county of Cook and State of Illinois, this 27th day of June 1927.

JAMES E. RUST.